United States Patent [19]
Fisher et al.

[11] 3,765,551
[45] Oct. 16, 1973

[54] UNLOADING RAMPS FOR THE LOAD RACK OF A BALE WAGON

[75] Inventors: Raymond E. Fisher, Lancaster, Pa.; Albert C. Cook, Kingsburg, Calif.

[73] Assignee: Sperry Rand Corporation, New Holland, Pa.

[22] Filed: Jan. 10, 1972

[21] Appl. No.: 216,386

[52] U.S. Cl. ........... 214/82, 214/8.5 A, 214/8.5 SS, 214/518
[51] Int. Cl. ..................... B65g 59/00, B60p 1/00
[58] Field of Search .................. 214/6 B, 82, 8.5 A, 214/8.5 SS, 510, 514, 518

[56] References Cited
UNITED STATES PATENTS
3,622,016  11/1971  Welker .......................... 214/82 X Primary Examiner—Robert J. Spar
Attorney—Joseph A. Brown, James L. Kennedy, John R. Flanagan and Frank A. Seemar

[57] ABSTRACT

A bale wagon having a load rack mounted to a wheel supported chassis structure with the front portion of the load rack being inclined upwardly towards the front of the bale wagon and including an inverted V-shape ramp structure disposed transversely the front terminal edge thereof for shifting the center of gravity of tiers being moved thereacross by a rolling rack, the tiers being moved thereacross being received by a table structure mounted adjacent the front terminal edge of the load rack.

7 Claims, 5 Drawing Figures

UNLOADING RAMPS FOR THE LOAD RACK OF A BALE WAGON

BACKGROUND OF THE INVENTION

The present invention relates to bale wagons and more particularly to the general type adapted for single bale unloading.

In recent years, single bale unloading bale wagons have been introduced to the hay farmers here in the United States. The best known single bale unloading bale wagon of today is of the type disclosed in U. S. Pat. No. 3,502,230, granted Mar. 24, 1970 to D. M. Grey et al. From this patent it will be observed that the bale wagon shown therein is of the basic three table type and includes a load rack mounted to a chassis structure and inclined upwardly towards the front of the bale wagon. The load rack is provided with a rolling rack assembly that is particularly adapted to move in a fore and aft direction along the load rack. To effectuate single bale unloading, the rolling rack is used to push the stack carried by the load rack towards the front terminal edge of the load rack, where the tiers comprising the stack fall therefrom onto an adjacent table structure. The table structure is provided with a cross conveyor that conveys individual layers of each tier from the bale wagon while the compliment of the tier is separated from the layer being conveyed by a series of bale separating hooks. Also, it is noted that the single bale unloading wagon is also adapted to pick up bales, form the bales into tiers, and load the tiers on the load rack to form a stack of side by side tiers thereon.

As previously noted, the load rack is inclined, relative to the ground, such that the front terminal edge is at a higher elevation than the rear end of the load rack. This particular incline design lends stability to the tiers being loaded on the load rack during the loading operation. But during single bale unloading, in which case the stack is moved forward in small increments such that a tier at a time is pushed off the front terminal edge of the load rack onto a table disposed adjacent thereto, the incline design of the load rack tends to cause problems in pushing a tier at a time onto the adjacent table. In particularly, the problem stems from the fact that the theoratical center of gravity tends to be directed generally behind the tier being unloaded and as the bottom bales of the tier move from the front terminal edge of the load rack they tend to "pop out" of the tier, causing the remaining bales of the tier to buckle and spill away from the bale wagon.

It is therefore the principle object of the present invention to provide means for shifting the center of gravity of a tier of bales being moved from an upwardly inclined terminal edge of a load rack to an adjacent table such that the center of gravity, as shifted, is generally directed parallel to the plane of the tier being unloaded and is effective to maintain the tier in a unitary block such that the tier may be transferred in an orderly manner from the load rack to the adjacent table.

A more particular object of the present invention resides in the provision of a bale wagon having a load rack with a front terminal edge inclined upwardly relative to a rear portion of the same load rack, a table structure mounted adjacent the terminal edge of said load rack, and a rolling rack moveable in a fore and aft direction along said load rack and particularly adapted to engage a rear portion of a stack of bales and move that stack forwardly towards the front terminal edge of the load rack, causing a tier at a time to be pushed off the fron terminal edge of the load rack onto said table, and wherein an exiting structure is transversely disposed adjacent the front terminal edge of said load rack and is particularly angled relatively thereto so as to lie in a general horizontal plane, thereby providing an interim structure between the load rack and the table which transposes each tier from the incline posture it assumes on the load rack to a generally upright vertical posture on the exiting structure.

In particular, it is the object of the present invention to provide the exiting structure in the form of an inverted V-shape ramp structure transversely disposed adjacent the front terminal edge of said load rack.

Also, it is an object of the present invention to further utilize the unloading ramp structure disposed adjacent the front terminal edge of the load rack to tip the rolling rack forwardly when it approaches the front terminal edge so as to push the rearmost last tier of the stack from the load rack onto the adjacent table.

DESCRIPTION OF THE PREFERRED EMBODIMENT

Figure 1:
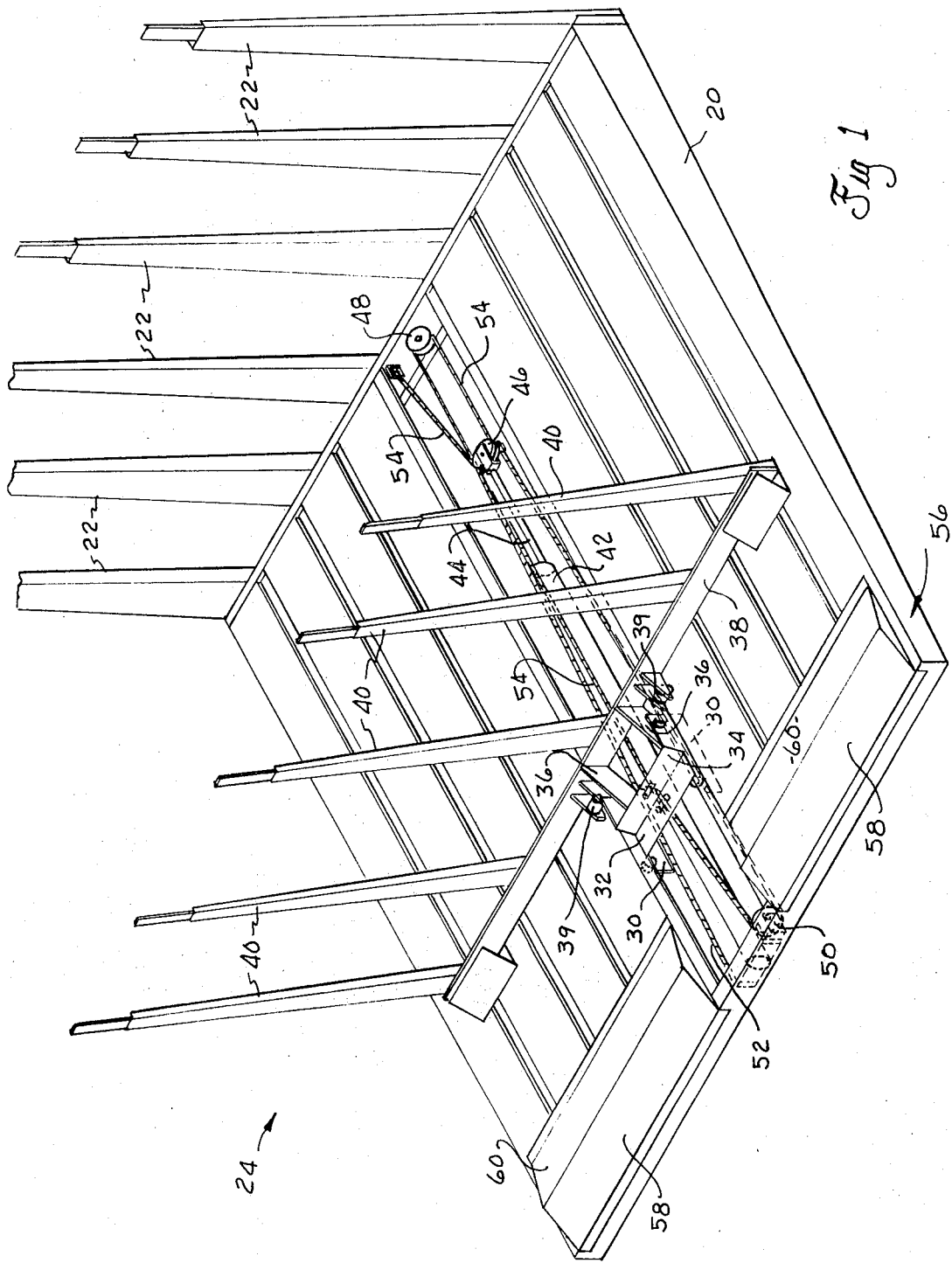
FIG. 1 is a perspective view of the load rack of a bale wagon, showing particularly the unloading ramps of the present invention and the rolling rack which is adapted to move fore and aft along the load rack.

With reference to the drawings, particularly FIGS. 2-5, a bale wagon is shown therein and indicated generally by the numeral 10. Bale wagon 10 is of the general three table type such as shown in U. S. Pat. No. 2,848,127 granted Aug. 19, 1958 to G. E. Grey. Although the three table type bale wagons are well known in the art, a detailed description of the fundamental structure and components thereof may be found in the last mentioned patent, namely U. S. Pat. No. 2,848,127. But briefly describing the bale wagon 10 shown in FIGS. 2-5 in general terms, it is noted that the bale wagon comprises a general elongated chassis structure 12 having a pair of tandemly arranged wheels 14 rotatively mounted to each side thereof. Extending forwardly from the chassis structure 12 is a clevis, not shown, that enables the bale wagon 10 to be connected to a tractor, also not shown.

Pivotally mounted in tandem relationship along the chassis 12 of the bale wagon is a receiving table 16, a second table 18 and a load rack 20, with each being pivotally mounted about a transverse axis, the transverse axes being longitudinally spaced relative to each other. The load rack 20 includes a plurality of laterally spaced generally upright fingers 22 mounted across the rear end thereof. Also, the load rack 20 includes a rolling rack, indicated generally by the numeral 24, moveably mounted for movement in a fore and aft direction along the surface of said load rack. A detailed description of the rolling rack 24 and the manner of powering the same fore and aft along the load rack 20 will be forthcoming.

Bale wagon 10 is of the single bale unloading type, i.e., capable of unloading one bale at a time from a composite stack comprised of a plurality of tiers disposed in a side by side relationship. Singel bale unloading wagons are per se old in the art, as clearly evidenced by U. S. Pat. No. 3,502,230 referred to under "Background of the Invention." The basic teaching of this patent revolves around pushing the stack towards the front of the bale wagon such that a tier at a time is pushed onto an adjacently mounted second table. The second table, as shown in the present disclosure, includes bale separating hooks 26 and a cross conveyor 28, with the cross conveyor 28 functioning to convey a layer at a time of each tier from the second table 18 while the bale separating hooks 26 engage the compliment of the tier and hold it in an upwardly separated position relative to the layer being conveyed such that there is no interference as the bales are being conveyed from the second table. For a detailed understanding and appreciation of the manner of controlling the hooks 26 and the cross conveyor 28, one is again referred to U. S. Pat. No. 3,502,230 granted to D. M. Grey et al.

Turning to FIG. 1, a detailed drawing of the load rack 20 of the present invention is shown therein. The rolling rack 24 which is disposed transversely of the load rack 20 comprises a carriage that is moveable fore and aft along the general longitudinal center line of the load rack. In particular, the carriage includes a pair of laterally spaced guide rails 30 interconnected by a base plate 32, with the guide rails 30 being provided with a series of rollers that engage and move on a track structure formed within the central portion of the load rack 20. Formed about the base plate 32 is a neck structure 34 that includes a pair of laterally spaced arms 36 pivotally mounted thereto. Fixed to the arms 36 and extending transversely across the load rack 20 is a transverse support member, denoted by the numeral 38. Fixed to said transverse support member 38 in lateral spaced apart relationship and extending gneerally upwardly therefrom is a series of rolling rack fingers 40. Disposed on each side of the rolling rack carriage is a roller 39 rotatively supported by a pair of brackets extending from the transverse support member 38. Each roller 39 is particularly spaced to engage an unloading ramp structure (to be discussed subsequently) disposed along the front terminal edge of the load rack 20, causing the arms 36 and fingers 40 to tip forwardly.

The main power source for actuating the rolling rack fore and aft along the load rack 20 is a hydraulic cylinder 42 anchored to the front of the load rack 20 and extending generally rearwardly therefrom about a central portion of the load rack. The cylinder 42 includes a rod end 44 that carries a double pulley arrangement 46. Also, stationed at opposite ends of the load rack 20 is a front pulley 50 and a rear pulley 48. A first cable 52 has one end fixed to the front of the load rack and extends rearwardly therefrom where a portion thereof is trained around one of the pulleys of the double pulley set 46 and returned to the front where another portion of the cable 52 is trained around front pulley 50 with the other end thereof being fixed to the rolling rack carriage. A second cable 54 is fixed to the rear of the load rack 20 and extends forwardly therefrom where a portion thereof is trained around the other pulley of the double pulley set 46, and trained back around rear pulley 48 from where the cable extends forwardly where the other end thereof connects to the same carriage. The present rolling rack drive arrangement is also quite similar to the rolling rack drive shown in U. S. Pat. No. 3,502,230, previously referred to as being granted to D. M. Grey et al. But in the way of general comments, it is observed that the extension of rod end 44 causes cable 52 to be pulled rearwardly, which causes the rolling rack 24 to move towards the front terminal edge of the load rack 20. In reverse manner, the retraction of the rod end 44 causes cable 54 to be pulled towards the front, causing the rolling rack 24 to be propelled to the rear of the load rack 20. During the single bale unloading operation, it will be appreciated that the rolling rack 24 will be disposed at the rear of the stack. Thus by extending the rod end 44 of the cylinder 42 in small increments, the rolling rack 24 is brought forward in proportional increments, causing a tier at a time to be moved from the load rack 20 to the second table 18.

It is in the area of transferring a tier from the load rack 20 to the second table 18 that the present invention relates. The present invention generally comprises an unloading ramp structure, indicated generally by the numeral 56, disposed transversely along the front terminal edge of the load rack 20, as best seen in FIG. 1. The unloading ramp structure 56 basically comprises a pair of laterally spaced inverted V-shaped ramp structures, with the space between the ramp structures being provided to accommodate the carriage of the rolling rack. In particular, the front half of the inverted V-shaped unloading ramp structures includes an exiting structure 58 that lies in a plane at an angle to the load rack and generally parallel to the ground G. The rear half of the inverted V-shaped ramp structure comprises an up-ramp 60 that guides the bales from the load rack onto the exiting structure 58.

Figure 2:
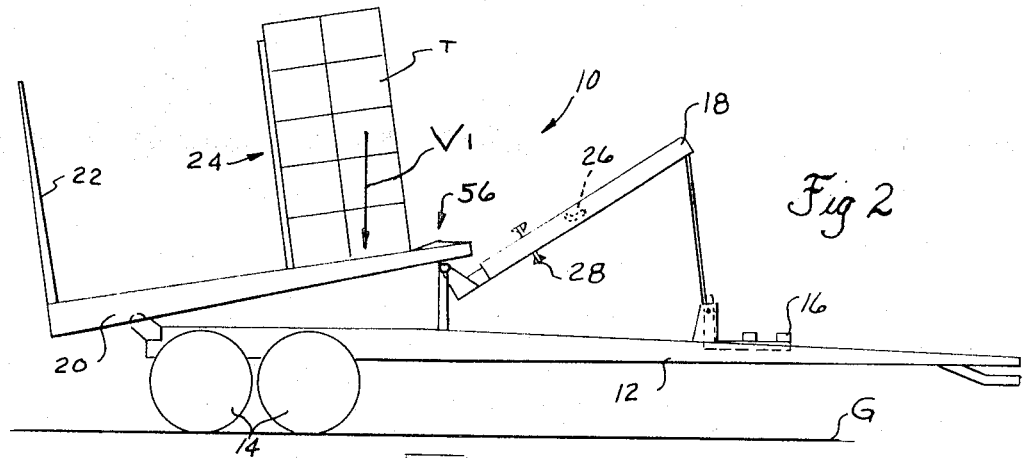
FIGS. 2-5 are a series of general schematic views showing the effect of the unloading ramps of the present invention as a tier is moved from the load rack to an adjacently mounted table.
Figure 3:
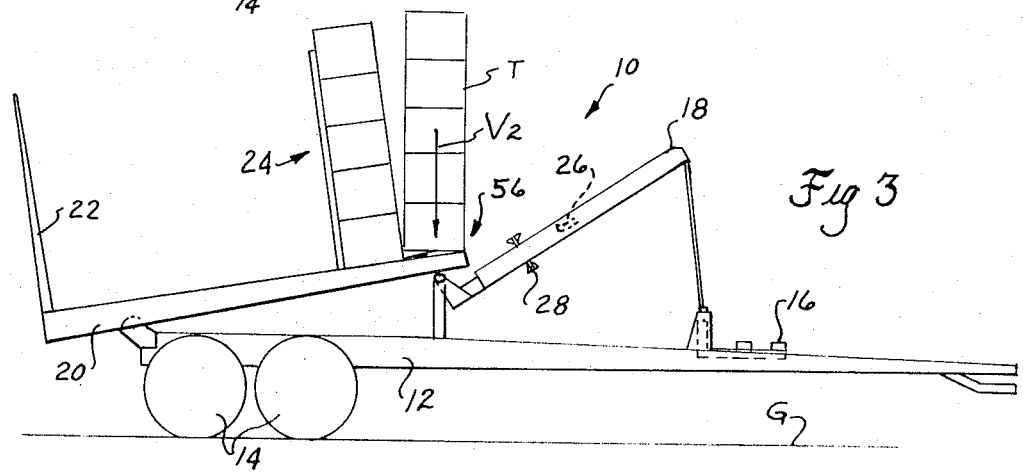
Figure 4:
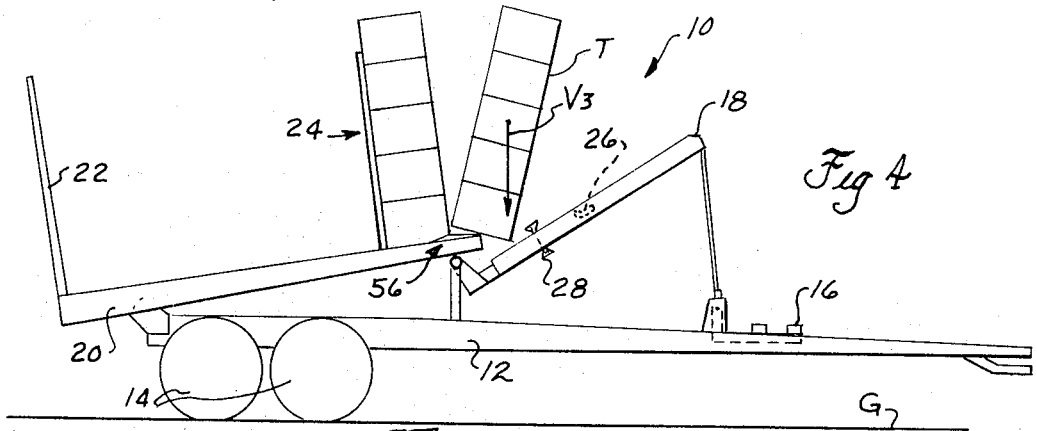
Figure 5:
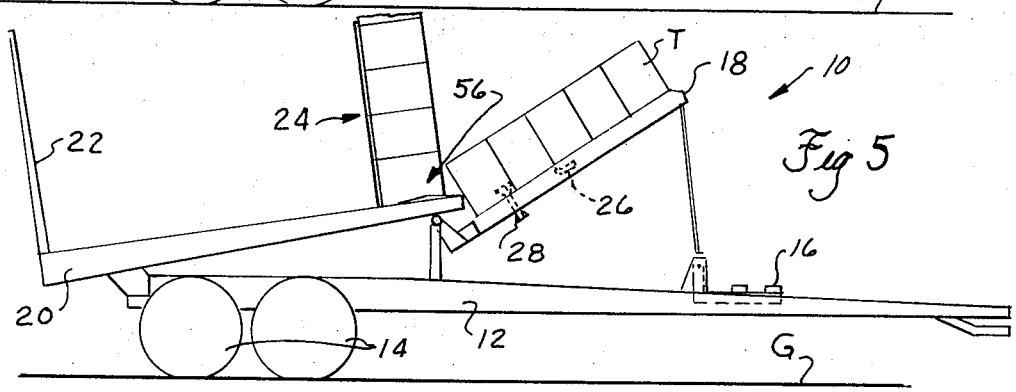

Turning to FIGS. 2–5, these drawings show the movement of a five high tier, denoted by the letter T, from the load rack 20, across the unloading ramps 56 and onto the second table 18. With reference to FIG. 2, due to the inclined disposition of the transfer table 20, the center of gravity of the tier T, represented by the vector $V_1$, is directed generally to the rear of the plane of the tier T. Without the use of the unloading ramps, the presence of the center of gravity being directed as shown in FIG. 2, often results in the lower bales falling away from the bales disposed thereabove. This, of course, results in the entire tier buckling and spilling away from the bale wagon. But with the presence of the unloading ramps 56, it is noted that as the tier T moves up on the ramp structure 56 that the center of gravity of that tier tends to shift forward, relative to the plane of the tier, as represented by the vectors $V_2$ and $V_3$ as shown in FIGS. 3 and 4 respectively. The shifting of the center of gravity tends to hold the entire tier together, and with the shifting of the center of gravity the entire tier tends to tilt forwardly onto the second table 18 as a unit, thereby avoiding the buckling and spilling out that was present with the bale wagons of the prior art. It is obvious that the problem often becomes much more pronounced when the single bale unloading operation is performed on uneven terrain or on a hillside. The present invention will generally provide some measure of remedy for these unloading problem situations also.

One final aspect of the present invention relates to the use of the unloading ramps to also tip the rolling rack forward when the rolling rack approaches the front terminal edge of the rolling rack, thereby causing the last tier of the stack to be tipped onto the second table 18. It will be observed from FIG. 1 that the transverse support bar 38 includes a pair of rollers 39 disposed on each side thereof for riding up the unloading ramp structure 56 and causing the rolling rack to be tipped forwardly. Therefore, the present invention has the dual utility of both facilitating the tier unloading operation from the load rack 20 while also serving to tip the rolling rack so that the final tier may be pushed from the load rack onto the second table 18.

The terms, "upper," "lower," "forward," "rearward" etc. have been used herein merely for the convenience of the foregoing specification and in the appended claims to describe the unloading ramps for the load rack of a bale wagon and its parts as oriented in the drawings. It is to be understood, however, that these terms are in no way limiting to the invention since the unloading ramps for the load rack of a bale wagon may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced therein.

Having thsu described out invention, what we claim is:

1. A bale wagon, comprising in combination: a wheel supported chassis structure adapted to be propelled over the ground; a load rack mounted to said chassis and having a front terminal edge inclined upwardly relative to the ground, said load rack being adapted to support a stack of bales having a plurality of tiers disposed in side by side relationshio; a rolling rack disposed transversely on said load rack and moveably mounted for an aft movement along said load rack, said rolling rack being particularly adapted to move said stack forwardly causing a tier at a time to be pushed off the front terminal edge of said load rack; a table mounted adjacent the fron erminal edge of said load rack for receiving tiers being pushed from said load rack by said rolling rack; and transversely extending ramp means mounted along the terminal edge of said load rack for shifting the center of gravity of each tier forward prior to the tier departing the load rack and being received by said table structure said ramp means having an area sufficient to cause each tier to be supported by said ramp as it is being discharged.

2. A bale wagon, as recited in claim 1, wherein said ramp means for shifting the center of gravity of each tier forward includes a generally inverted V-shaped ramp structure disposed transversely about said front terminal edge of said load rack.

3. A bale wagon, as recited in claim 1, wherein said rolling rack includes means for engaging said ramp means when said rolling rack approaches the front terminal edge of said load rack for tipping said rolling rack forwardly such that the rearmost last tier of the stack is pushed from said load rack, whereby said ramp means serve the dual function of shifting the center of gravity of each tier and tipping the rolling rack to move the rearmost tier of the stack from the load rack, 4. A bale wagon, as recited in claim 3, wherein said ramp means includes a pair of laterally spaced inverted V-shaped ramp structures disposed transversely the front terminal edge of said load rack, and wherein said means for engaging said ramp means for tipping said rolling rack forwardly includes a following mechanism operatively associated with said rolling rack and adapted to ride up the inner portions of the inverted V-shaped ramps.

5. A bale wagon, as recited in claim 1, wherein said ramp means includes an exiting structure disposed adjacent said terminal edge and angled relative to said load rack such that said exiting structure lies in a plane generally parallel to the ground, whereby as each tier is moved from said load rack onto said exiting structure the center of gravity of the tier is shifted forwardly, thereby enabling the tier to move as a unit to said table structure without the risk of the entire tier buckling and spilling away from the bale wagon.

6. A bale wagon, as recited in claim 5, wherein said exiting structure generally comprises the forward half of an inverted V-shaped ramp structure disposed transversely about the front terminal edge of said load rack, and wherein the rear half of the inverted V-shaped ramp structure includes an up ramp which allows the tiers to be moved from the load rack to said exiting structure.

7. A bale wagon, as recited in claim 1, wherein said transversely extending ramp means extends from one side of the load rack to the other side of the load rack.

* * * * *